US012700793B2

(12) United States Patent
Cremonesi et al.

(10) Patent No.: US 12,700,793 B2
(45) Date of Patent: Aug. 4, 2026

(54) CONSTANT CHARGE CONTROL FOR DC-DC CONVERTERS

(71) Applicants: STMicroelectronics S.r.l., Agrate Brianza (IT); Politecnico Di Milano, Milan (IT)

(72) Inventors: Lorenzo Cremonesi, Sant'Angelo Lodigiano (IT); Paolo Melillo, Caltanissetta (IT); Alessandro Gasparini, Cusano Milanino (IT); Massimo Ghioni, Monza (IT); Salvatore Levantino, Milan (IT)

(73) Assignees: STMicroelectronics S.r.l., Agrate Brianza (MB) (IT); Politecnico Di Milano, Milan (IT)

( * ) Notice: Subject to any disclaimer, the term of this patent is extended or adjusted under 35 U.S.C. 154(b) by 498 days.

(21) Appl. No.: 18/218,750

(22) Filed: Jul. 6, 2023

(65) Prior Publication Data

US 2025/0015708 A1      Jan. 9, 2025

(51) Int. Cl.
| | |
|---|---|
| *H02M 1/08* | (2006.01) |
| *H02M 1/088* | (2006.01) |
| *H02M 3/158* | (2006.01) |
| *H02M 1/00* | (2006.01) |

(52) U.S. Cl.
CPC ........... *H02M 1/088* (2013.01); *H02M 3/158* (2013.01); *H02M 1/0009* (2021.05)

(58) Field of Classification Search
CPC ..... H02M 1/088; H02M 1/0009; H02M 3/158
See application file for complete search history.

(56) References Cited

U.S. PATENT DOCUMENTS

| | | | |
|---|---|---|---|
| 6,597,157 B1 * | 7/2003 | Boeckmann | ............ G05F 1/618 323/242 |
| 8,283,907 B1 | 10/2012 | Jayaraj | |
| 9,325,243 B2 | 4/2016 | Jayaraj et al. | |
| 10,381,927 B2 | 8/2019 | Childs | |
| 11,152,846 B2 | 10/2021 | Matei et al. | |
| 11,223,276 B1 * | 1/2022 | Cai | ..................... H02M 1/0022 |
| 2007/0120547 A1 * | 5/2007 | Tateishi | ................. H02M 3/158 323/282 |
| 2014/0211526 A1 | 7/2014 | Pidutti et al. | |
| 2015/0280544 A1 | 10/2015 | Wang et al. | |
| 2021/0242774 A1 * | 8/2021 | Yun | ..................... H02M 1/0025 |
| 2021/0313887 A1 * | 10/2021 | Mariani | ................. H02M 3/158 |

* cited by examiner

*Primary Examiner* — Rafael O De Leon Domenech
(74) *Attorney, Agent, or Firm* — Crowe & Dunlevy LLC

(57) ABSTRACT

Disclosed herein is a DC-DC converter, including a high-side power switch coupled between an input voltage and a switched node and a low-side power switch coupled between the switched node and ground. An inductor is coupled between the switched node and an output node. An output capacitor is coupled between the output node and ground. A control circuit is configured to operate the high-side power switch in a constant charge mode of operation to vary on-time of the high-side power switch to maintain a constant amount of charge being transferred to the output capacitor during each charging cycle, independent of variation of the input voltage.

15 Claims, 4 Drawing Sheets

CONSTANT CHARGE CONTROL FOR DC-DC CONVERTERS

TECHNICAL FIELD

This disclosure is directed to the field of power electronics, in particular to the regulation and control of output voltage ripple in DC-DC converters using Pulse Frequency Modulation (PFM) and Constant On-Time (COT) controls.

BACKGROUND

DC-DC converters are utilized in power management across a wide range of electronic devices, serving to convert input direct current (DC) of one voltage level to output DC of another voltage level. By adjusting voltage levels in this manner, DC-DC converters facilitate efficient power distribution within a device.

Common elements of known basic DC-DC converters, such as buck and boost converters, include a power transistor and an inductor. The power transistor, acting as a switch, is used to control the flow of current through the circuit. The inductor stores energy in its magnetic field when current flows through it and then releases that energy when the current flow is reduced or stopped.

One technique for controlling these converters involves the use of Pulse Frequency Modulation (PFM). PFM control is a type of switched mode power supply control method where the frequency of the power transformer is modulated, based on the load conditions, to maintain regulation. One way to obtain pulse frequency modulation involves Constant On Time (COT) control, which is a control technique in which the on-time of the power transistor is held constant while the off-time varies based on load conditions. In combination, PFM and COT controls may allow for fast and efficient control of DC-DC converters in certain situations. However, these controls may be subject to output voltage ripple variations due to changes in the line voltage.

Continuous Conduction Mode (CCM) control is a conventional approach employed to address this challenge. In this mode, current flows continuously through the inductor, and the converter does not depend on the input voltage. However, CCM control is less efficient under light load conditions, where the constant switching frequency can degrade the efficiency of the converter.

Another known known approach is Adaptive Constant On-Time (ACOT) control, which incorporates an integral loop to adapt the on-time or peak current threshold based on the line voltage. This, however, may result in a slower converter response and consume a larger physical area due to the presence of the integrator.

Therefore, there is a need for an improved control technique for DC-DC converters that can maintain a consistent charge injection into the output capacitor, regardless of variations in the line voltage. Preferably, it would be desired for such an improved control technique to mitigate the output ripple, improve DC regulation, maintain high-efficiency performance under various load conditions, and reduce system complexity.

SUMMARY

Disclosed herein is a DC-DC converter, including a high-side power switch coupled between an input voltage and a switched node, a low-side power switch coupled between the switched node and ground, an inductor coupled between the switched node and an output node, an output capacitor coupled between the output node and ground, and a control circuit. The control circuit is configured to operate the high-side power switch in a constant charge mode of operation to vary on-time of the high-side power switch to maintain a constant amount of charge being transferred to the output capacitor during each charging cycle, independent of variation of the input voltage.

The control circuit may include a peak inductor current threshold generator configured to generate a threshold voltage indicative of a desired peak current through the inductor based upon the input voltage and an output voltage at the output node, a peak current control circuit configured to compare the threshold voltage to a ramp voltage indicative of a current through the inductor, and a controller configured to turn off the low-side power switch while turning on the high-side power switch until the ramp voltage becomes equal to the threshold voltage, and then turning off the high-side power switch while turning on the low-side power switch.

The peak current control circuit may include a comparator configured to compare the ramp voltage indicative of the current through the inductor to the threshold voltage, and generate a control signal based thereupon. The peak current control circuit may also include a current subtractor configured to generate an output including ramp current by subtracting a current indicative of the output voltage from a current indicative of the input voltage, a peak current capacitor, and a switch. The switch is configured to couple the peak current capacitor to ground when the control signal is asserted, and to couple the peak current capacitor to receive the ramp current when the control signal is deasserted.

The peak inductor current threshold generator may include a current divisor configured to generate a division current based upon a division operation performed on the current indicative of the input voltage and the output of the current subtractor and a rooting circuit configured to perform a square rooting operation on the division current and produce an output thereof as the threshold voltage.

A current mirror may be configured to mirror the division current generated by the current divisor to the rooting circuit.

The rooting circuit may include a first transistor coupled between a supply voltage and a first node, the first transistor having a gate coupled to be controlled as a function of the division current. The rooting circuit may also include a second transistor coupled between the first node and ground, the second transistor having a gate coupled to be controlled as a function of a voltage at a second node. The rooting circuit may further include a third transistor coupled between the second node and ground, the third transistor having a gate coupled to be controlled as a function of the voltage at the second node.

The rooting circuit also includes a fourth transistor coupled between the supply voltage and the second node, the fourth transistor being controlled as a function of a voltage at a third node.

The rooting circuit may also include a fifth transistor diode coupled between a fourth node and ground, with the division current being sourced to the fourth node.

The first transistor may be a first n-channel transistor having a drain connected to the supply voltage, a source connected to the first node, and a gate connected to the fourth node. The second transistor may be a second n-channel transistor having a drain connected to the first node, a source connected to ground, and a gate connected to the second node. The third transistor may be a third n-channel transistor having a drain connected to the second node, a source connected to ground, and a gate connected to the second node. The fourth transistor may be a first p-channel transistor having a source connected to the supply voltage, a drain connected to the second node, and a gate connected to the third node. The fifth transistor may be a fourth n-channel transistor having a drain connected to the fourth node, a source connected to ground, and a gate connected to the fourth node.

A current mirror may be configured to mirror the division current generated by the current divisor to the rooting circuit. The current mirror may include a sixth transistor coupled to receive the division current, a seventh transistor coupled in a mirroring relationship with the sixth transistor to thereby sink a replica of the division current from the third node, an eighth transistor coupled to have replica of the division current sunk therefrom, a ninth transistor coupled in a mirroring relationship with the eighth transistor to thereby source the division current to the fourth node, and a tenth transistor coupled in a mirroring relationship with the ninth transistor.

The sixth transistor may be a fifth n-channel transistor having a drain coupled to receive the division current, a gate connected to its drain, and a source connected to ground. The seventh transistor may be a sixth n-channel transistor having a drain connected to the third node, a source connected to ground, and a gate connected to the third node, the seventh transistor being in a mirror relationship with the sixth transistor. The eighth transistor may be a second p-channel transistor (MP1) having a source connected to the supply voltage, a drain connected to the third node, and a gate connected to the third node. The ninth transistor may be a third p-channel transistor having a source connected to the supply voltage, a drain connected to the fourth node, and a gate connected to the third node. The tenth transistor may be a fourth p-channel transistor having a source connected to the supply voltage, a drain connected to ground, and a gate connected to the third node.

Method aspects are also disclosed herein. For example, disclosed herein is a method of operating a DC-DC converter including turning off a low-side power switch and turning on a high-side power switch in response to each time a feedback voltage being equal lower than a reference voltage to thereby begin a charging cycle. The method may further include setting on-time of the high-side power switch to maintain a constant amount of charge being transferred from an input node, in cooperation with an inductor, to an output capacitor during each charging cycle, independent of variation of an input voltage at the input node.

Setting the on-time of the high-side power switch to maintain the constant amount of charge being transferred from the input node, in cooperation with the inductor, to the output capacitor during each charging cycle, independent of the input voltage at the input node may be performed by generating a threshold voltage indicative of a desired peak current through the inductor based upon the input voltage and an output voltage at an output node, comparing the threshold voltage to a ramp voltage indicative of a current through the inductor, and turning off the low-side power switch while turning on the high-side power switch until the peak voltage becomes equal to the threshold voltage, then turning off the high-side power switch while turning on the low-side power switch, then turning off the low-side power switch when the current through the inductor zero crosses.

Generating the threshold voltage may include generating a division current based upon a division operation performed on a current indicative of the input voltage and an output of a difference between the current indicative of the input voltage and a current indicative of the output voltage, and performing a square rooting operation on the division current and producing an output thereof as the threshold voltage.

DETAILED DESCRIPTION

Figure 1:
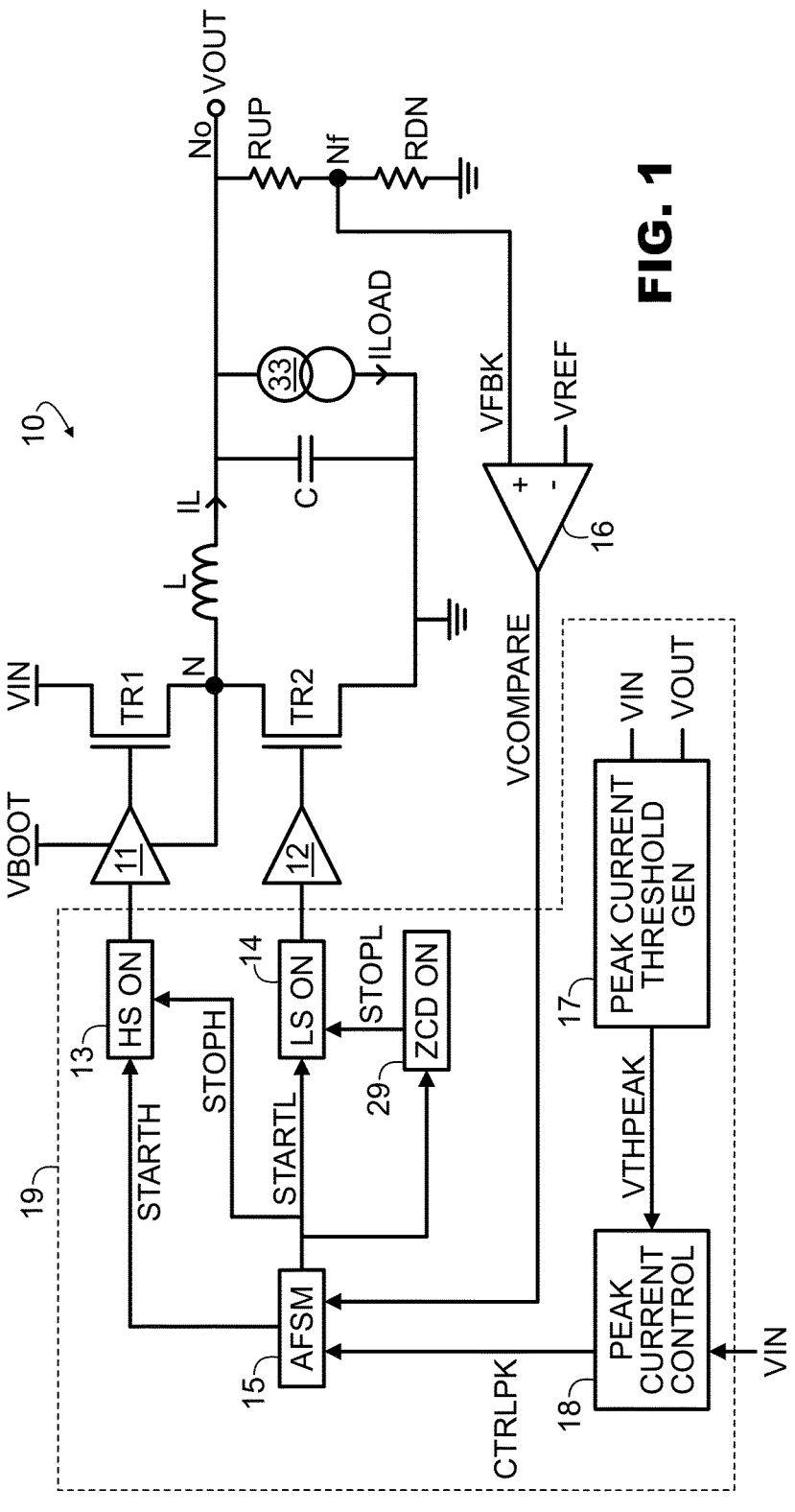
FIG. 1 is a block diagram of a DC-DC converter disclosed herein.

The following disclosure enables a person skilled in the art to make and use the subject matter described herein. The general principles outlined in this disclosure can be applied to embodiments and applications other than those detailed above without departing from the spirit and scope of this disclosure. It is not intended to limit this disclosure to the embodiments shown, but to accord it the widest scope consistent with the principles and features disclosed or suggested herein.

Note that in the following description, any resistor or resistance mentioned is a discrete device, unless stated otherwise, and is not simply an electrical lead between two points. Therefore, any resistor or resistance connected between two points has a higher resistance than a lead between those two points, and such resistor or resistance cannot be interpreted as a lead. Similarly, any capacitor or capacitance mentioned is a discrete device, unless stated otherwise, and is not a parasitic element, unless stated otherwise. Additionally, any inductor or inductance mentioned is a discrete device, unless stated otherwise, and is not a parasitic element, unless stated otherwise.

A synchronous buck converter 10 is now described. The synchronous buck converter 10 includes a first MOS TR1 that is connected between an input voltage $V_{IN}$ and a switched node N, with its gate driven by the output of a high-side driver 11. The synchronous buck converter 10 also includes a second MOS TR2 that is situated between the switched node N and ground, with its gate driven by the output of a low-side driver 12. An inductor L is connected between the switched node N and the output voltage node No. An output capacitor C is connected between the output node No, at which the output voltage $V_{OUT}$ is produced, and ground. The load 33, represented as a current source sinking a load current $I_{LOAD}$, is illustrated as being connected between the output node No and ground. A feedback ladder, formed by resistors RUP and RDN, is connected in series between the output node No and ground, with a feedback voltage $V_{FBK}$ produced at the tap node Nf, situated between the resistors. A comparator 16 receives the feedback voltage $V_{FBK}$ at its non-inverting input terminal and receives a reference voltage $V_{REF}$ at its inverting input terminal, and generates an output comparison signal $V_{COMPARE}$ based upon the comparison—as an example, $V_{COMPARE}$ is asserted to a logic high when the feedback voltage $V_{FBK}$ is equal to or greater than the reference voltage $V_{REF}$, but is otherwise deasserted to a logic low. As an alternative, the comparator 16 can be configured such that $V_{COMPARE}$ is asserted to a logic high when the feedback voltage $V_{FBK}$ is less than the reference voltage $V_{REF}$, but is otherwise deasserted to a logic low. A control circuit 19 is responsible for generating pre-drive signals to the high-side driver 11 and low-side driver 12 based in part on the comparison signal $V_{COMPARE}$, and therefore can be considered to operate to turn-on or turn-off the transistors TR1 and TR2.

Operation of the synchronous buck converter 10 in a conventional constant-on time (COT) mode is first described. Operation in this mode begins when the output voltage $V_{OUT}$ falls below a specified reference level, triggering a charging cycle. During this charging cycle, the transistor TR1 is turned on by the control circuit 19 to thereby charge the inductor L to the input voltage $V_{IN}$. Thereafter, the transistor TR1 is turned off while the transistor TR2 is turned on by the control circuit 19 to thereby connect the switched node N to ground. The duration of the on-time of the transistor TR1 is constant, while that of the transistor TR2 is variable in this mode of operation. This dynamic switching action of transistors TR1 and TR2 produces a square wave on the node N, which is filtered by the LC filter formed by the inductor L and the output capacitor C, and allows the step down of the input voltage $V_{IN}$.

Consider, however, a scenario where the input voltage $V_{IN}$ fluctuates during this operation. If the on-time of transistor TR1 remains constant, the peak $I_{LPEAK}$ of the inductor current IL will change, resulting in varying amounts of charge being injected into the output capacitor C. This leads to errors in regulation, as it results in a lack of steady output voltage $V_{OUT}$ when the input voltage $V_{IN}$ varies.

Therefore, the aim of the control circuit 19 is to control the synchronous buck converter 10 in a constant charge mode of operation in which the amount of charge transferred during each charging cycle remains constant, independent of fluctuations in the input voltage $V_{IN}$. This is accomplished by varying the peak inductor current $I_{LPEAK}$ based upon the input voltage $V_{IN}$ and output voltage $V_{OUT}$, through control of the high-side transistor TR1.

The charge $\Delta Q$ injected into the output capacitor C can be mathematically expressed as shown below, which demonstrates its relationship to the peak inductor current $I_{LPEAK}$, the input voltage $V_{IN}$, the output voltage $V_{OUT}$, the load current $I_{LOAD}$, and the inductance L of the inductor.

$$\Delta Q = \frac{(I_{LPEAK} - I_{LOAD})^2}{V_{OUT}} \frac{L}{2} \frac{V_{IN}}{V_{IN} - V_{OUT}} \approx \frac{I_{LPEAK}^2}{V_{OUT}} \frac{L}{2} \frac{V_{IN}}{V_{IN} - V_{OUT}} \quad (1)$$

This equation can be rearranged to solve for $I_{LPEAK}$:

$$I_{L,PEAK} = \sqrt{2 \frac{\Delta Q}{L} V_{OUT} \frac{V_{IN} - V_{OUT}}{V_{IN}}} \quad (2)$$

The switching frequency (Fsw) of the transistor TR1 can then be calculated by dividing the load current $I_{LOAD}$ by the change in charge $\Delta Q$:

$$F_{sw} = \frac{I_{LOAD}}{\Delta Q} \quad (3)$$

The voltage ripple $\Delta V$ can also be calculated by dividing the change in charge $\Delta Q$ by the capacitance C:

$$\Delta V = \frac{\Delta Q}{C} \quad (4)$$

This information is utilized by a feed-forward mechanism, provided by the peak inductor current threshold generator 17 and the peak current control circuit 18, to anticipate changes in the input voltage $V_{IN}$. This mechanism permits adjust the peak inductor current $I_{LPEAK}$ accordingly to maintain a constant amount of charge transferred during each charging cycle to the output capacitor C.

In the context of the block diagram, the input voltage $V_{IN}$ is monitored by the peak current control circuit 18 and the peak inductor current threshold generator 17. The peak inductor current threshold generator 17 adapts the threshold to the input voltage $V_{IN}$ and the peak current control circuit 18 tracks the current flowing through the inductor L, together producing a digital signal to the asynchronous finite state machine (AFSM) circuit 15, which in turn sets the duration of the on-time of transistor TR1. During the off-time of transistor TR1, the AFSM circuit 15 turns on transistor TR2. This collectively provides for a constant charge of the capacitor C during each charging cycle regardless of fluctuations in the input voltage $V_{IN}$. This in turn allows maintenance of a constant output voltage $V_{OUT}$ and switching frequency Fsw despite changes in the input voltage $V_{IN}$.

This constant charge mode of operation (and the circuitry effectuating it) are subjects of this disclosure and will now be explained in detail. Operation in this mode begins when the output voltage $V_{OUT}$ falls below a specified reference level, indicated by the feedback voltage $V_{FBK}$ falling below the reference voltage $V_{REF}$ triggering a charging cycle, with the on-time of the high-side transistor TR1 thereby being set by the control circuit 19. In particular, during off-time cycles, the transistor TR2 is caused to be turned on by the AFSM circuit 15, and during on-time cycles the transistor TR1 is turned on as described above while the transistor TR2 is turned off.

The control circuit 19 includes a peak inductor current threshold generator 17 that generates a voltage $V_{THPEAK}$ indicative of the desired peak inductor current $I_{LPEAK}$, based upon which the peak current control circuit 18 generates a peak current control signal $CTRL_{PK}$. The peak current control signal $CTRL_{PK}$, as well as the comparison signal $V_{COMPARE}$, are received by the AFSM circuit 15 as input. Based upon these inputs, the AFSM circuit 15 generates a high-side start signal $START_H$ and a low-side start signal $START_-$, with a high-side stop signal $STOP_H$ being equivalent to the low-side start signal $START_L$. In particular, when the comparator 16 asserts the output comparison signal $V_{COMPARE}$ in response to the feedback voltage $V_{FBK}$ becoming lower than the reference voltage $V_{REF}$, the AFSM circuit 15 asserts the high-side start signal $START_H$ to cause turn-on of the transistor TR1 and asserts the low-side stop signal $STOP_L$ to cause turn-off of the transistor TR2. When the AFSM 15 asserts the high-side stop signal $STOP_H$ in response to the peak current control circuit 18 asserting the peak current control circuit 18 to thereby cause turn-off of the transistor TR1, this is also an assertion of the low-side start signal $START_L$ to thereby cause turn-on of the transistor TR2, with transistor TR2 then being turned off once the zero-cross detector 29 asserts the low-side stop signal $STOP_L$ to cause turn-off of the transistor TR2 in response to zero crossing of the coil current IL.

The control circuit 19 includes a high-side pre-driver 13 generating the pre-drive signal for the high-side driver 11 based upon the high-side start signal $START_H$ and high-side stop signal $STOP_H$, and a low-side pre-driver 14 generating the pre-drive signal for the low-side driver 14 based upon the low-side start signal $START_L$ and a low-side stop signal $START_L$.

Figures 2, 3:
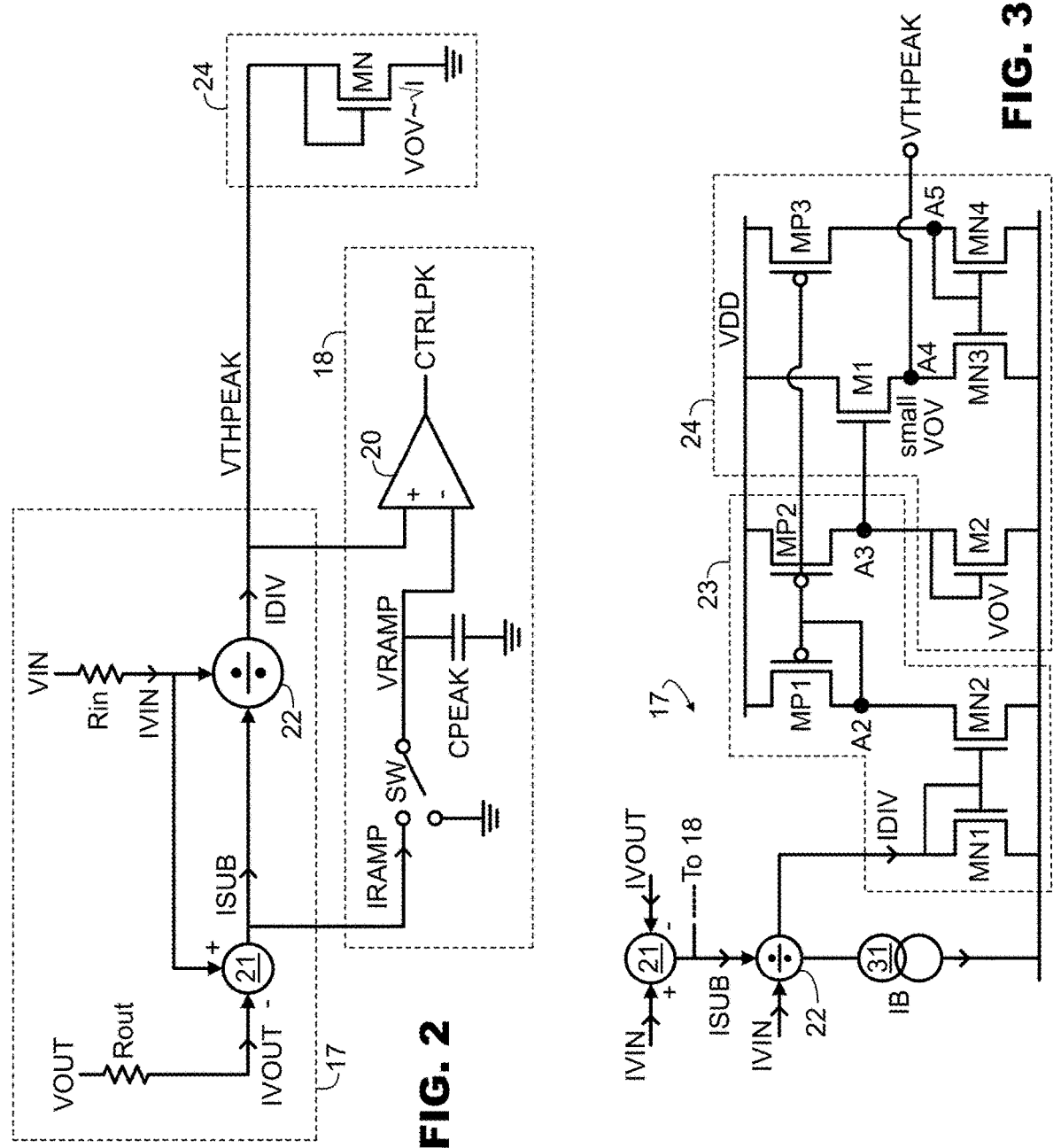
FIG. 2 is a block diagram of the peak inductor current threshold generator and the peak current control circuit of FIG. 1.
FIG. 3 is a schematic diagram of the peak inductor current threshold generator of FIG. 2.

A general embodiment of the peak inductor current threshold generator 17 and the peak current control circuit 18 are now described with additional reference to FIG. 2. The peak current control circuit 18 effectively replicates the information about the current IL flowing through the inductor L contained within equation (2) above, while the peak inductor current threshold generator 17 sets the voltage $V_{THPEAK}$ indicative of the desired peak inductor current $I_{LPEAK}$.

The peak inductor current threshold generator 17 includes a current subtracting junction 21. The current subtracting junction 21 subtracts a current $$I_{V_{OUT}} = \frac{V_{OUT}}{R},$$

proportional to the output voltage $V_{OUT}$, from another current $$I_{V_{IN}} = \frac{V_{IN}}{R},$$

proportional to the input voltage $V_{IN}$. This operation essentially yields a current represented by $$I_{SUB} = \frac{V_{IN} - V_{OUT}}{R},$$

which is proportional to the difference between the input and output voltages $V_{IN}$ and $V_{OUT}$.

The currents $I_{V_{IN}}$ and $I_{SUB}$ are then fed into a current divider 22. This component outputs a current $$I_{DIV} = \frac{I_0(V_{IN} - V_{OUT})}{V_{IN}},$$

which represents a ratio between the subtracted current $I_{SUB}$ and the input voltage $V_{IN}$. This divided current $I_{DIV}$ is delivered to a rooting circuit 24. This rooting circuit conducts a square root operation and a current-to-voltage conversion. The resulting voltage $V_{TH_{PEAK}}$, applied to the negative input of the comparator 20 of the peak current control circuit 18, is a voltage threshold indicative of the desired peak inductor current $I_{LPEAK}$ and can be represented as:

$$V_{TH_{PEAK}} \propto \sqrt{\frac{V_{IN} - V_{OUT}}{V_{IN}}}$$

The peak current control circuit 18 is now described. The switch SW either discharges a capacitor $C_{PEAK}$ to ground or connects the current subtracting junction 21 to the capacitor $C_{PEAK}$ to receive a ramp current $I_{SUB}$ equal to $I_{SUB}$; switch SW is closed at the end of every high side on period (at the end of every one period of transistor TR1), resetting the voltage across the capacitor $C_{PEAK}$ so that at the beginning of every charging cycle, the voltage $V_{RAMP}$ across the capacitor $C_{PEAK}$ (representative of the current IL through the inductor L) is zero.

Consequently, the comparator 20 receives the voltage $V_{RAMP}$ at its non-inverting input and the voltage $V_{THPEAK}$ resulting from the rooted and converted current from the rooting circuit 24 at its inverting input, and asserts its output $CTRL_{PK}$ in response to $V_{RAMP}$ becoming at least equal to $V_{THPEAK}$.

The adaptive control circuit 19 helps ensure that the voltage ramp at the positive input of the comparator 20, proportional to the input voltage $V_{IN}$, mimics the behavior of the inductor current IL. The capacitor $C_{PEAK}$ is selected such that the equation $$\frac{V_{IN}}{RC_{PEAK}} = \frac{V_{IN}}{L}$$

is satisfied, causing that the ramp current $I_{RAMP}$ to possesses the desired waveform.

This approach allows the adaptive control circuit 19 to help ensure that variations in input voltage correspondingly adjust the peak inductor current threshold $I_{L,peakTH}$ and the effective peak current flowing through the inductor L. This maintains the efficient operation of the DC-DC converter and provides a stable output voltage, regardless of input voltage variations.

Further details of the peak inductor current threshold generator 17 are now given with reference to the transistor level design of FIG. 3. Note here the current generator 31 sinking a current IB from current divider 22, which divides $I_{V_{IN}}$ by $I_{SUB}$, yielding the divided current $I_{DIV}$.

The current mirror 23 is now described and includes an n-channel transistor MN1 having its drain coupled to receive the divided current $I_{DIV}$, its source connected to ground, and its gate connected to the gate of n-channel transistor MN2. N-channel transistor MN2 in turn has its source connected to ground and its drain connected to node A2. P-channel transistor MP1 has its source connected to the supply voltage VDD, its drain connected to node A2, and its gate connected to node A2. P-channel transistor MP2 has its source connected to the supply voltage VDD, its drain connected to node A3, and its gate connected to node A2.

The rooting circuit 24 is now described, and includes diode coupled n-channel transistor M2 is connected between node A3 and ground. N-channel transistor M1 has its drain connected to the supply voltage VDD, its source connected to node A4, and its gate connected to node A3. N-channel transistor MN3 has its drain connected to node A4, its source connected to ground, and its gate connected to node A5. P-channel transistor MP3 has its source connected to the supply voltage VDD, its drain connected to node A5, and its gate connected to node A2. N-channel transistor MN4 has its drain connected to node A5, its source connected to ground, and its gate connected to node A5. The voltage $V_{THPEAK}$ is produced at node A4.

Operation of the peak inductor current threshold generator 17 of FIG. 3 is now described. The rooting circuit 24 takes as input the divided current $I_{DIV}$ produced by the current divider 22, which is mirrored thereby and feeds the diode coupled transistor M2 such that the gate to source voltage of M2 is:

$$V_{GS,M2} = \sqrt{\frac{2I_{DS,M2}}{(W/L)_2 \mu C_{ox}}} + V_{TH}$$

The threshold voltage $V_{TH}$ of transistor M2 is subtracted via the transistor M1, sized with a sufficiently large aspect ratio to make the overdrive voltage $V_{OV}$ negligible. The output voltage $V_{THPEAK}$ is:

$$V_{THPEAK} = \sqrt{\frac{2I_{DS,2}}{(W/L)_2 \mu C_{ox}}} = I_0 R \sqrt{\frac{(W/L)_B}{(W/L)_S}} \sqrt{\frac{V_{IN} - V_{OUT}}{V_{IN}}}$$

Figure 4:
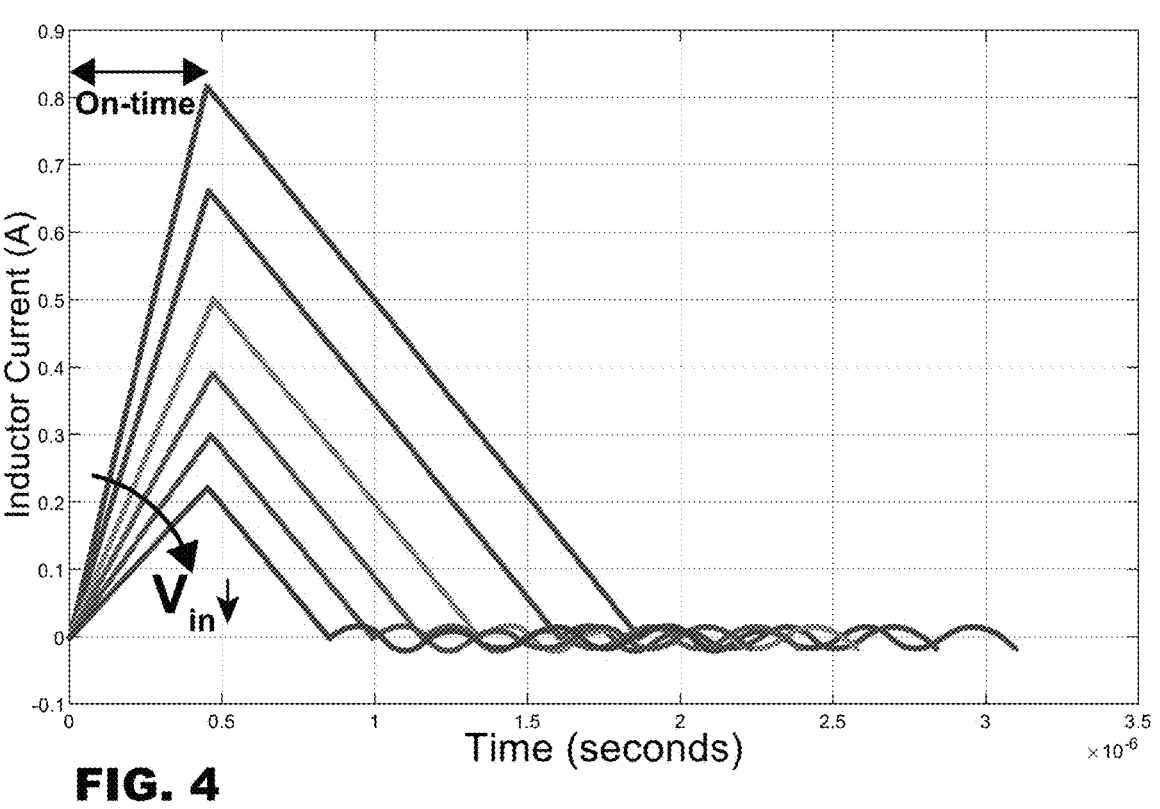
FIG. 4 is a graph showing inductor current over time of the DC-DC converter of FIG. 1 when operated according to a prior art technique.
Figure 5:
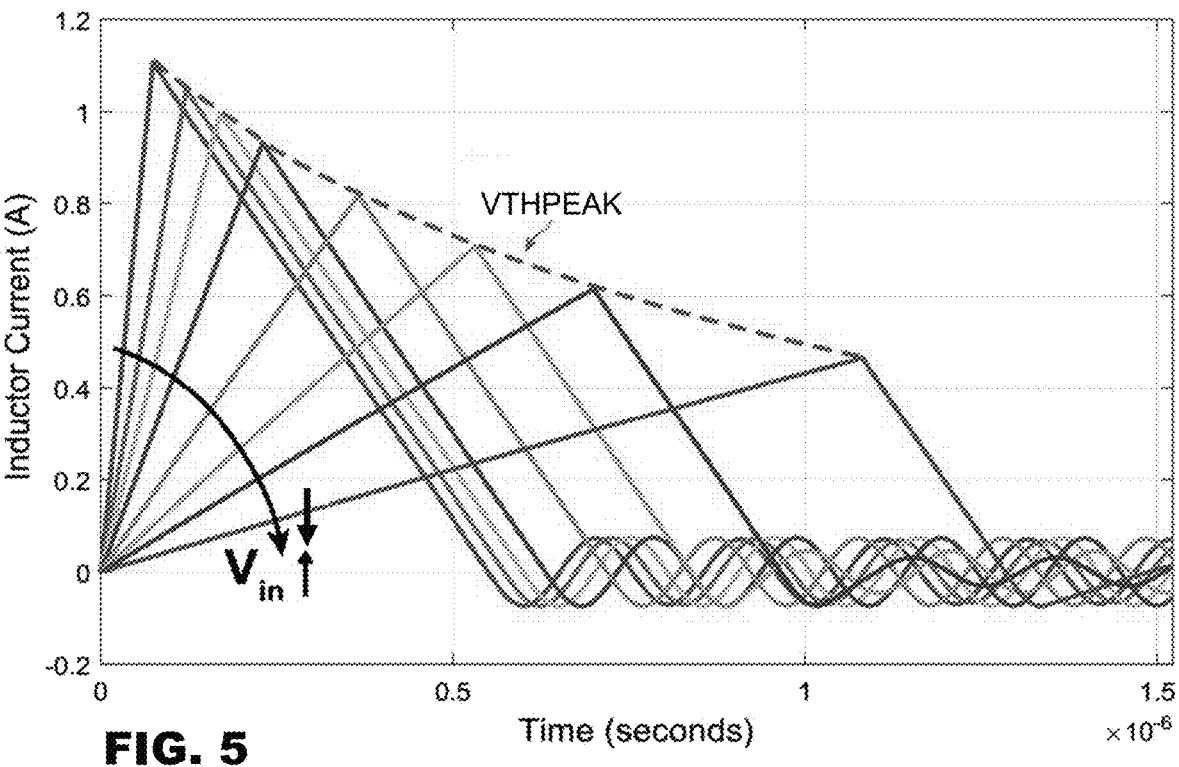
FIG. 5 is a graph showing inductor current over time of the DC-DC converter of FIG. 1 when operated according to the constant charge control technique of this disclosure.
Figure 6:
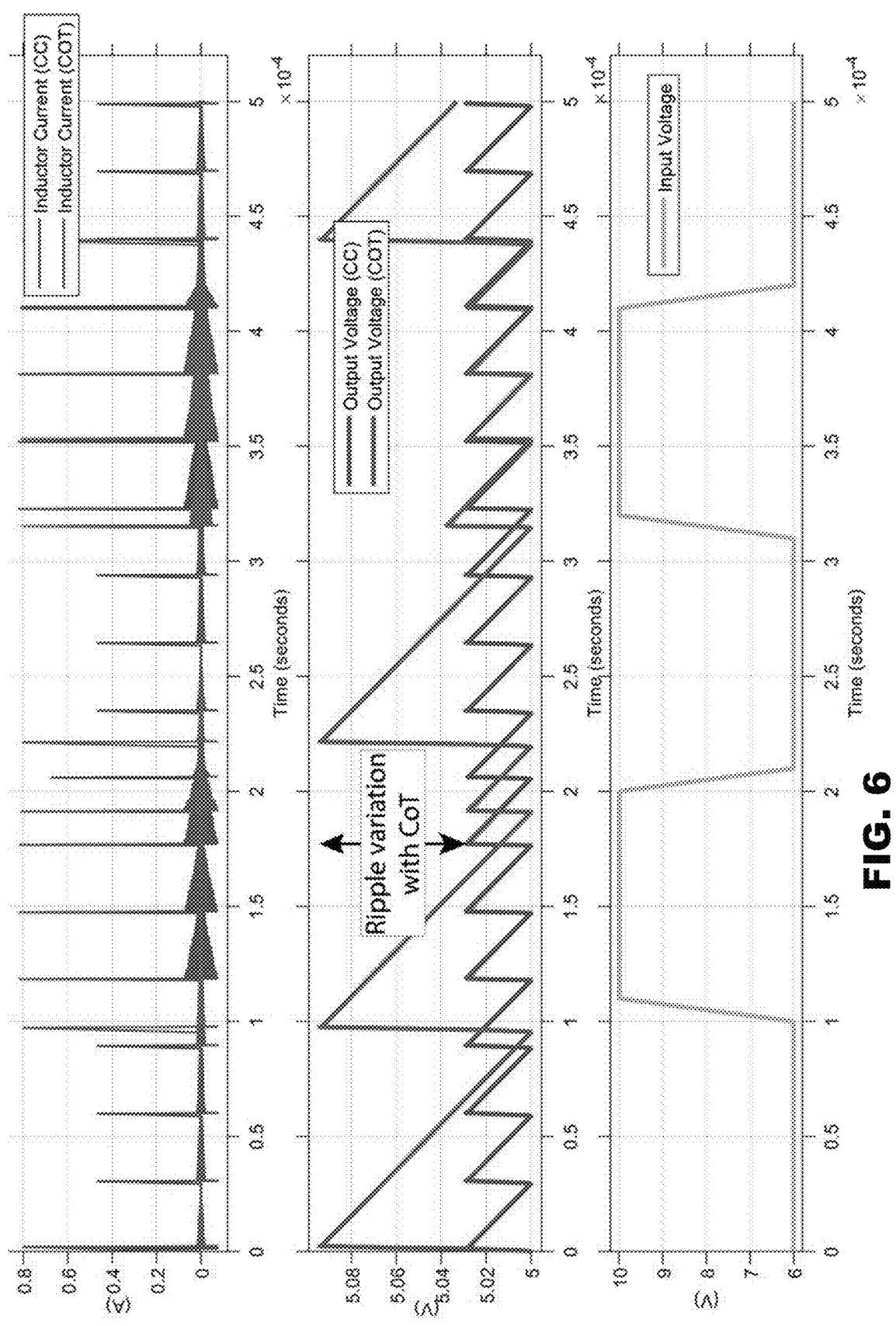
FIG. 6 is a graph showing output voltage ripple variation over time of the DC-DC converter of FIG. 1 when operated according to the constant charge control technique of this disclosure versus the ripple variation of a converter operated according to a prior art technique.

The benefits of the synchronous buck converter 10 disclosed herein may be understood with reference to FIGS. 4-6. Shown in FIG. 4 is the inductor current IL over time if the synchronous buck converter 10 would be controlled according to a prior art COT control system operated with a standard constant on-time. Shown in FIG. 5 is the inductor current IL over time if the synchronous buck converter 10 is controlled according to the constant charge scheme disclosed herein, making the charge transferred to the output capacitor C independent of the input voltage $V_{IN}$, providing for consistent regulation of the output voltage $V_{OUT}$. From this graph, it can also be seen that the voltage $V_{THPEAK}$ varies (goes down) as the input voltage $V_{IN}$ goes down. Finally, from FIG. 6, it can be seen that the ripple variation with the prior art COT control system is high as compared to the ripple variation with the constant charge scheme disclosed herein. High ripple can induce noise, cause undesired interference in the circuit, and may negatively affect the lifespan of the capacitors in the converter.

Finally, it is evident that modifications and variations can be made to what has been described and illustrated herein without departing from the scope of this disclosure.

Although this disclosure has been described with a limited number of embodiments, those skilled in the art, having the benefit of this disclosure, can envision other embodiments that do not deviate from the disclosed scope. Furthermore, skilled persons can envision embodiments that represent various combinations of the embodiments disclosed herein made in various ways.

The invention claimed is:

1. A DC-DC converter, comprising:
   a high-side power switch coupled between an input voltage and a switched node;
   a low-side power switch coupled between the switched node and ground;
   an inductor coupled between the switched node and an output node;
   an output capacitor coupled between the output node and ground; and
   a control circuit configured to operate the high-side power switch in a constant charge mode of operation to vary on-time of the high-side power switch to maintain a constant amount of charge being transferred to the output capacitor during each charging cycle, independent of variation of the input voltage.

2. The DC-DC converter of claim 1, wherein the control circuit comprises:
   a peak inductor current threshold generator configured to generate a threshold voltage indicative of a desired peak current through the inductor based upon the input voltage and an output voltage at the output node;
   a peak current control circuit configured to compare the threshold voltage to a ramp voltage indicative of a current through the inductor; and
   a controller configured to turn off the low-side power switch while turning on the high-side power switch until the ramp voltage becomes equal to the threshold voltage, and then turning off the high-side power switch while turning on the low-side power switch.

3. The DC-DC converter of claim 2, wherein the peak current control circuit comprises:
   a comparator configured to compare the ramp voltage indicative of the current through the inductor to the threshold voltage, and generate a control signal based thereupon;
   a current subtractor configured to generate an output including ramp current by subtracting a current indicative of the output voltage from a current indicative of the input voltage;
   a peak current capacitor; and
   a switch configured to couple the peak current capacitor to ground when the control signal is asserted, and to couple the peak current capacitor to receive the ramp current when the control signal is deasserted.

4. The DC-DC converter of claim 3, wherein the peak inductor current threshold generator comprises:
   a current divisor configured to generate a division current based upon a division operation performed on the current indicative of the input voltage and the output of the current subtractor; and
   a rooting circuit configured to perform a square rooting operation on the division current and produce an output thereof as the threshold voltage.

5. The DC-DC converter of claim 4, further comprising a current mirror configured to mirror the division current generated by the current divisor to the rooting circuit.

6. The DC-DC converter of claim 4, wherein the rooting circuit comprises:
   a first transistor coupled between a supply voltage and a first node, the first transistor having a gate coupled to be controlled as a function of the division current;
   a second transistor coupled between the first node and ground, the second transistor having a gate coupled to be controlled as a function of a voltage at a second node; and
   a third transistor coupled between the second node and ground, the third transistor having a gate coupled to be controlled as a function of the voltage at the second node.

7. The DC-DC converter of claim 6, wherein the rooting circuit further comprises a fourth transistor coupled between the supply voltage and the second node, the fourth transistor being controlled as a function of a voltage at a third node.

8. The DC-DC converter of claim 7, wherein the rooting circuit further comprises a fifth transistor diode coupled between a fourth node and ground, with the division current being sourced to the fourth node.

9. The DC-DC converter of claim 8, wherein:
   the first transistor comprises a first n-channel transistor having a drain connected to the supply voltage, a source connected to the first node, and a gate connected to the fourth node;

the second transistor comprises a second n-channel transistor having a drain connected to the first node, a source connected to ground, and a gate connected to the second node;

the third transistor comprises a third n-channel transistor having a drain connected to the second node, a source connected to ground, and a gate connected to the second node;

the fourth transistor comprises a first p-channel transistor having a source connected to the supply voltage, a drain connected to the second node, and a gate connected to the third node; and the fifth transistor comprises a fourth n-channel transistor having a drain connected to the fourth node, a source connected to ground, and a gate connected to the fourth node.

10. The DC-DC converter of claim 9, further comprising a current mirror configured to mirror the division current generated by the current divisor to the rooting circuit; and wherein the current mirror comprises:

a sixth transistor coupled to receive the division current;

a seventh transistor coupled in a mirroring relationship with the sixth transistor to thereby sink a replica of the division current from the third node;

an eighth transistor coupled to have replica of the division current sunk therefrom;

a ninth transistor coupled in a mirroring relationship with the eighth transistor to thereby source the division current to the fourth node; and a tenth transistor coupled in a mirroring relationship with the ninth transistor.

11. The DC-DC converter of claim 10, wherein:

the sixth transistor comprises a fifth n-channel transistor having a drain coupled to receive the division current, a gate connected to its drain, and a source connected to ground;

the seventh transistor comprises a sixth n-channel transistor having a drain connected to the third node, a source connected to ground, and a gate connected to the third node, the seventh transistor being in a mirror relationship with the sixth transistor;

the eighth transistor comprises a second p-channel transistor having a source connected to the supply voltage, a drain connected to the third node, and a gate connected to the third node;

the ninth transistor comprises a third p-channel transistor having a source connected to the supply voltage, a drain connected to the fourth node, and a gate connected to the third node; and the tenth transistor comprises a fourth p-channel transistor (MP3) having a source connected to the supply voltage, a drain connected to ground, and a gate connected to the third node.

12. A method of operating a DC-DC converter, comprising:

turning off a low-side power switch and turning on a high-side power switch in response to each time a feedback voltage is equal lower than a reference voltage to thereby begin a charging cycle; and setting on-time of the high-side power switch to maintain a constant amount of charge being transferred from an input node, in cooperation with an inductor, to an output capacitor during each charging cycle, independent of variation of an input voltage at the input node.

13. The method of claim 12, wherein setting the on-time of the high-side power switch to maintain the constant amount of charge being transferred from the input node, in cooperation with the inductor, to the output capacitor during each charging cycle, independent of the input voltage at the input node is performed by:

generating a threshold voltage indicative of a desired peak current through the inductor based upon the input voltage and an output voltage at an output node;

comparing the threshold voltage to a ramp voltage indicative of a current through the inductor; and turning off the low-side power switch while turning on the high-side power switch until the ramp voltage becomes equal to the threshold voltage, then turning off the high-side power switch while turning on the low-side power switch, then turning off the low-side power switch when the current through the inductor zero crosses.

14. The method of claim 13, wherein generating the threshold voltage comprises:

generating a division current based upon a division operation performed on a current indicative of the input voltage and an output of a difference between the current indicative of the input voltage and a current indicative of the output voltage; and performing a square rooting operation on the division current and producing an output thereof as the threshold voltage.

15. The method of claim 14, further comprising mirroring the division current generated by the current divisor to the rooting circuit using a current mirror.

* * * * *